United States Patent [19]
Yu

[11] Patent Number: 5,272,523
[45] Date of Patent: Dec. 21, 1993

[54] MATRIX CIRCUIT FOR SEPARATING COLOR SIGNAL OF A VIDEO CAMERA INTO COLOR-DIFFERENCE SIGNALS

[75] Inventor: Kyung-Soo Yu, Suwon, Rep. of Korea

[73] Assignee: Samsung Electronics Co., Ltd., Rep. of Korea

[21] Appl. No.: 999,769

[22] Filed: Dec. 31, 1992

[30] Foreign Application Priority Data

Dec. 31, 1991 [KR] Rep. of Korea ............... 1991-25378

[51] Int. Cl.⁵ .............................................. H04N 9/67
[52] U.S. Cl. .................... 358/30; 358/21 R; 358/41
[58] Field of Search ............ 358/30, 29, 29 C, 21 R, 358/13, 23, 41, 14, 16

[56] References Cited
U.S. PATENT DOCUMENTS

| | | | |
|---|---|---|---|
| 4,346,400 | 8/1982 | Hovens | 358/30 |
| 4,661,841 | 4/1987 | Suzuki | 358/27 |
| 4,667,224 | 5/1987 | Fujisige | 358/29 |
| 4,891,689 | 1/1990 | Senda et al. | 358/30 |

FOREIGN PATENT DOCUMENTS 4-192988 7/1992 Japan .
2073535 10/1981 United Kingdom .

*Primary Examiner*—James J. Groody
*Assistant Examiner*—Sherrie Hsia
*Attorney, Agent, or Firm*—Sughrue, Mion, Zinn, Macpeak & Seas

[57] ABSTRACT

A matrix circuit for separating a color signal of a video camera into color-difference signals comprises an adder circuit for combining R, G, B signals into composite color signals R-G and B-G, time division circuit for subjecting the composite color signals R-G and B-G to time division process according to externally input clock pulses, and demultiplexer for demultiplexing the output of the time division circuit according to externally input clock pulses to produce two color difference signals R-Y and B-Y.

13 Claims, 3 Drawing Sheets

CR,CB,CG

R-G
B-G

R-Y
B-Y

MATRIX CIRCUIT FOR SEPARATING COLOR SIGNAL OF A VIDEO CAMERA INTO COLOR-DIFFERENCE SIGNALS

TECHNICAL BACKGROUND

The present invention relates to a matrix circuit for separating a color signal of a video camera into color-difference signals by using a digital signal processor.

A conventional matrix circuit includes, as shown in FIG. 1, a mixer 1 for combining R, G, B color signals into R-G and B-G signals, a circuit having a plurality of multipliers 2, 3, 4, 5 and adders 6, 7 for receiving the output of the mixer 1 to produce two color-difference signals R-Y and B-Y, and a comparator 8 for comparing the two color-difference signals to produce a white balance detection signal. Such conventional circuit is very complicated suffering various drawbacks such as volume increase, signal deterioration, limited data processing, etc.

SUMMARY OF THE INVENTION

It is an object of the present invention to provide a matrix circuit using a digital signal processor that resolves the above drawbacks.

According to the present invention, there is provided a matrix circuit for separating a color signal of a video camera into color-difference signals, which includes an adder circuit for combining R, G, B signals into composite color signals R-G and B-G, time division circuit for subjecting the composite color signals R-G and B-G to time division process according to external input clock pulses, and demultiplexer for demultiplexing the output of the time-division circuit according to external input clock pulses to produce two color difference signals R-Y and B-Y.

BRIEF DESCRIPTION OF THE ATTACHED DRAWINGS

For a better understanding of the invention and to show how the same may be carried into effect, reference will now be made, by way of example, to the accompanying diagrammatic drawings, in which.

DETAILED DESCRIPTION OF A CERTAIN PREFERRED EMBODIMENT

Figure 1:
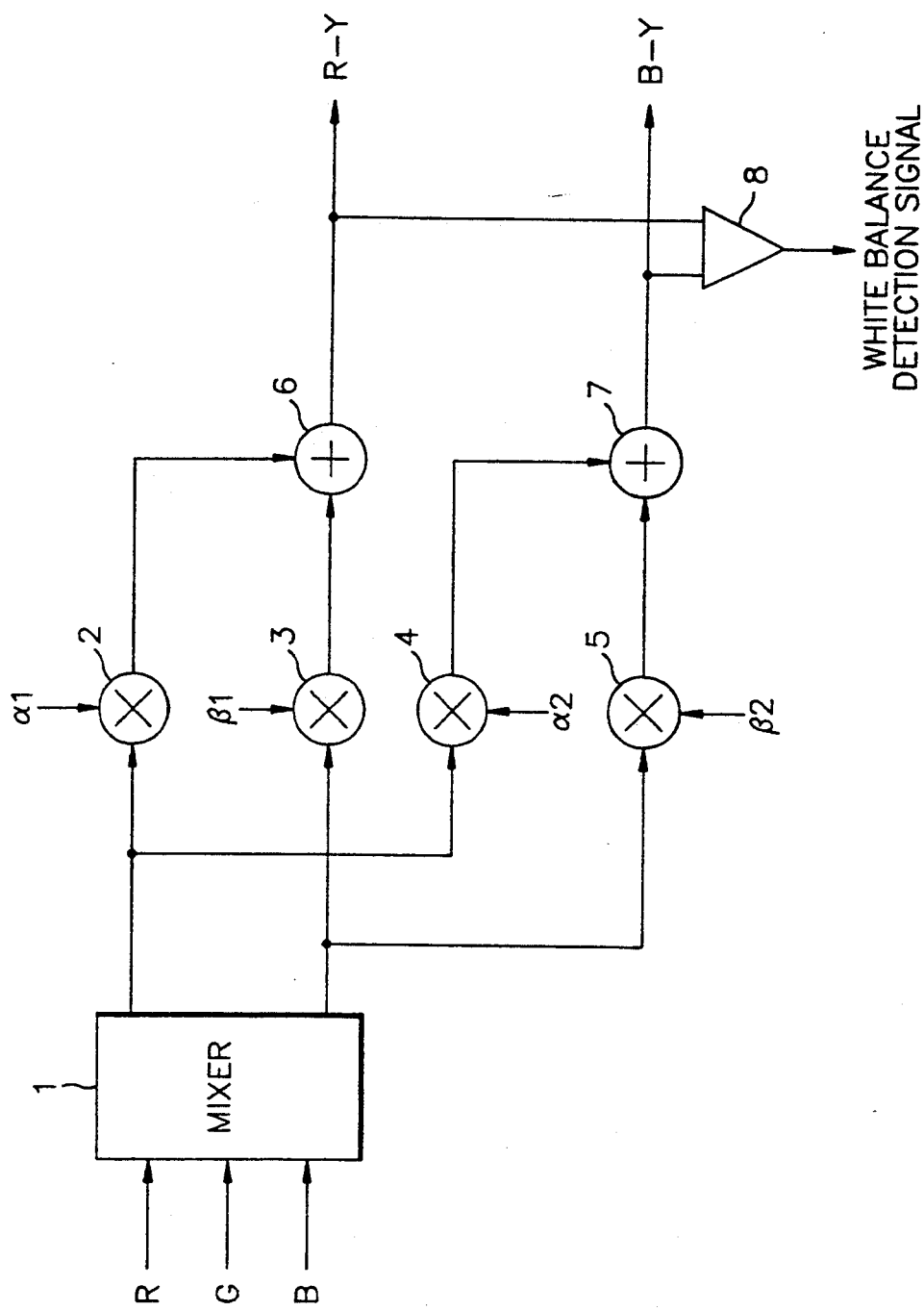
FIG. 1 is a prior art matrix circuit.
Figure 2:
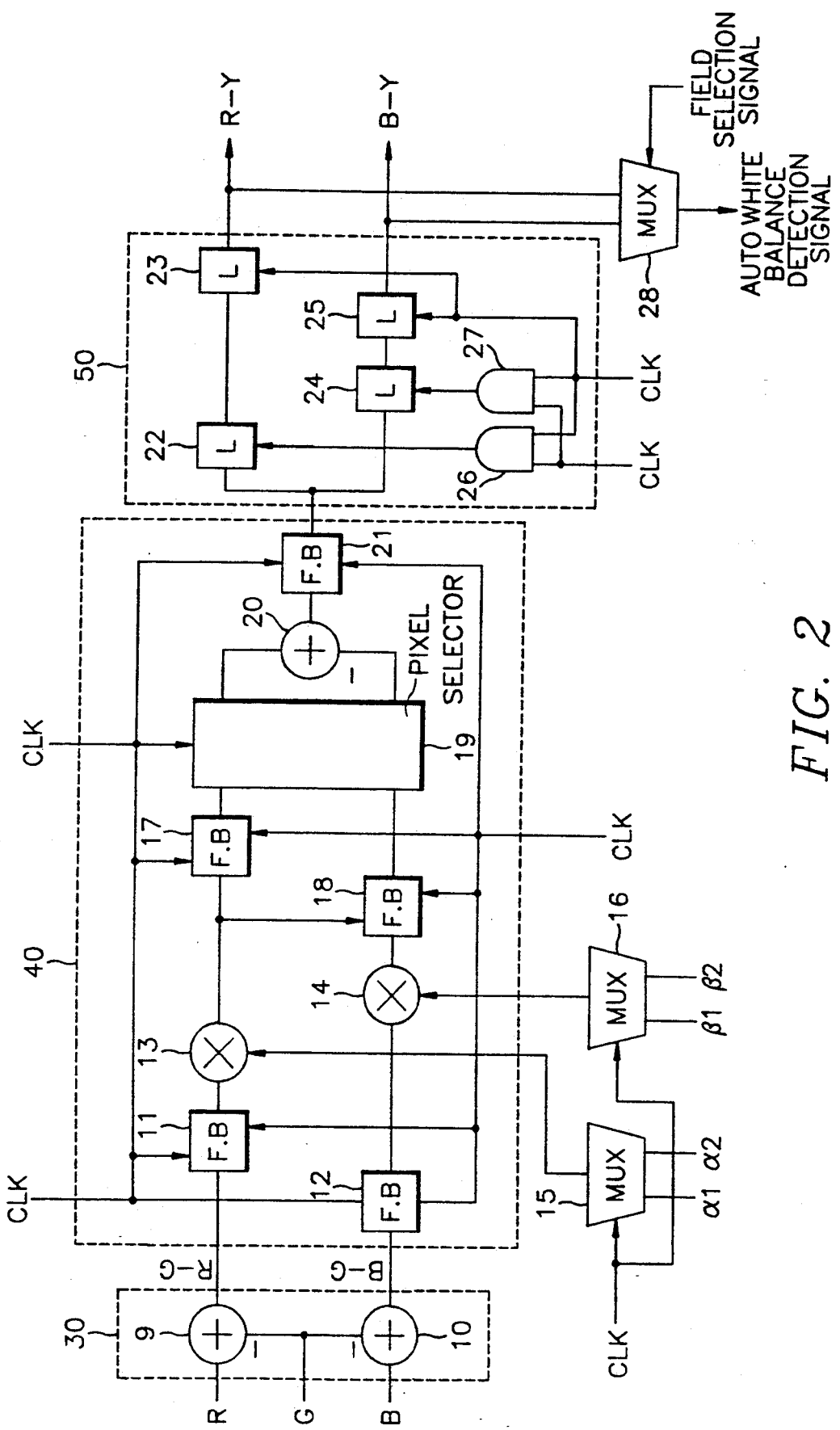
FIG. 2 is a matrix circuit according to the present invention.

Referring to FIG. 2, color signals R, G, B from a color separation sample and hold circuit (not shown) are received by an adder circuit 30 including first and second adders 9 and 10. A time division circuit 40 includes a plurality of full-bit delays 11, 12, 17, 18, 21, first and second multipliers 13 and 14, pixel selector 19, and third adder 20. The first and second multipliers 13 and 14 are respectively connected with first and second multiplexers 15 and 16. The output of the time division circuit 40 is applied to a demultiplexer 50 to produce two color-difference signals R-Y and B-Y according to external input clock pulses CLK. The demultiplexer 50 includes first and second AND-gates 26 and 27 and a plurality of latch circuits 22, 23, 24, 25. The first and second multiplexers 15 and 16 respectively control the two composite color signals R-G and B-G respectively generated by the first and second adders 9 and 10. The color-difference signals R-Y and B-Y are applied to a third multiplexer 28 to produce an automatic white balance detection signal according to a field selection signal.

The inputs $\alpha 1, \alpha 2$ to the first multiplexer 15 and $\beta 1, \beta 2$ to the second multiplexer 16 are determined by a microcomputer (not shown), so that the following equations are met:

$$Y = 0.59G + 0.11B + 0.3R$$

$$R\text{-}Y = 0.7(R\text{-}G) - 0.11(B\text{-}G)$$

$$B\text{-}Y = -0.3(R\text{-}G) + 0.89(B\text{-}G)$$

The operation of the present embodiment is described with reference to FIGS. 2 and 3A to 3C.

Figure 3A:
FIGS. 3A to 3C are diagrams for illustrating the operational timing of FIG. 2.
Figure 3B:
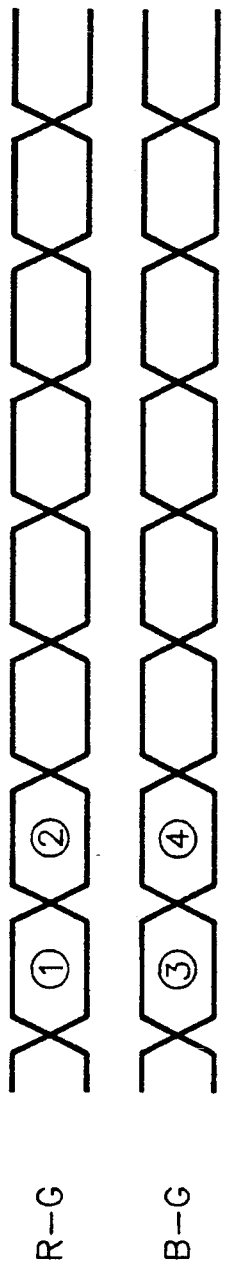

The color signals from the color separation sample and hold circuit have the mixed waveform CR, CG, CB before time division, as shown in FIG. 3A. The input signals R, G, B are combined by the adder circuit 30 to produce the composite color signals R-G and B-G that are subjected to the time division process of the time division circuit 40 controlled by the first and second multiplexers 15 and 16 so as to produce double signals R-G and B-G as shown in FIG. 3B. In FIG. 3B, the portions "1" and "4" respectively have R-G and B-G signals and the portions "2" and "3" signals contain no information.

Figure 3C:
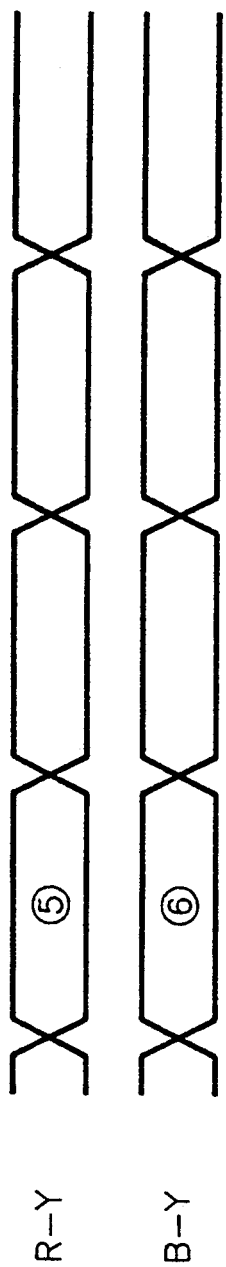

The output of the time division circuit 40 is applied to the demultiplexer 50 to produce the color-difference signals R-Y and B-Y as shown by "5" and "6" in FIG. 3C.

While the invention has been particularly shown and described with reference to a preferred embodiment, it will be understood by those skilled in the art that modifications in detail may be made without departing from the spirit and scope of the invention.

What is claimed is:

1. A matrix circuit for separating a color signal of a video camera into color-difference signals, comprising:
   an adder circuit having first and second adders for combining R, G, B color signals into first and second composite color signals R-G and B-G;
   first and second multiplexers for respectively controlling said first and second composite color signals R-G and B-G;
   a time division circuit having a plurality of full-bit delay circuits, a plurality of multipliers, a pixel selector, and an adder for subjecting said first and second composite color signals R-G and B-G to a time division process according to external input clock pulses; and
   a demultiplexer having a plurality of AND-gates and a plurality of latch circuits for demultiplexing an output of said time division circuit according to external input clock pluses to produce first and second color difference signals R-Y and B-Y.

2. The matrix circuit as defined in claim 1, wherein said time division circuit includes first and second full-bit delay circuits connected to receive the first and second composite color signals R-G and B-G, respectively, and first and second multipliers coupled to receive outputs of said first and second full-bit delay circuits, respectively, and wherein said first and second multipliers are also coupled to receive outputs of said first and second multiplexers, respectively.

3. The matrix circuit as defined in claim 2, further comprising third and fourth full-bit delay circuits coupled to receive outputs of said first and second multipliers, respectively.

4. The matrix circuit as defined in claim 3, wherein said pixel selector is coupled to receive respective outputs of said third and fourth full-bit delay circuits.

5. The matrix circuit as defined in claim 4, wherein said adder is coupled to receive outputs of said pixel selector.

6. The matrix circuit as defined in claim 5, further comprising a fifth full-bit delay circuit coupled to receive an output of said adder.

7. The matrix circuit as defined in claim 6, wherein said demultiplexer is coupled to receive an output of said fifth full-bit delay circuit.

8. A matrix circuit for separating a color signal into color-difference signals, comprising:
   an adder circuit for combining color signals into composite color signals;
   a time division circuit for subjecting said composite color signals to time division thereby outputting a time division output signal;
   a multiplexer circuit coupled to said time division circuit for controlling said composite color signals; and
   a demultiplexer for demultiplexing the time division output signal so as to provide the color difference signals.

9. The matrix circuit as defined in claim 8, wherein said adder circuit comprises a pair of adders, each of said adders receiving two different color signals.

10. The matrix circuit as defined in claim 8, wherein said time division circuit comprises a plurality of full-bit delay circuits, a plurality of multipliers, a pixel selector circuit and an adder.

11. The matrix circuit as defined in claim 8, wherein said multiplexer circuit comprises first and second multiplexers, said adder circuit outputs first and second composite color signals, and wherein said first and second multiplexers respectively control said first and second composite color signals.

12. The matrix circuit as defined in claim 8, further comprising multiplexer means coupled to receive the color difference signals, and a field selection signal.

13. The matrix circuit as defined in claim 8, wherein said demultiplexer comprises a plurality of latch circuits and a plurality of AND gates.

* * * * *